July 19, 1966 R. W. KREPLIN 3,262,002
CONVERTIBLE X-RAY DETECTOR
Filed July 17, 1961
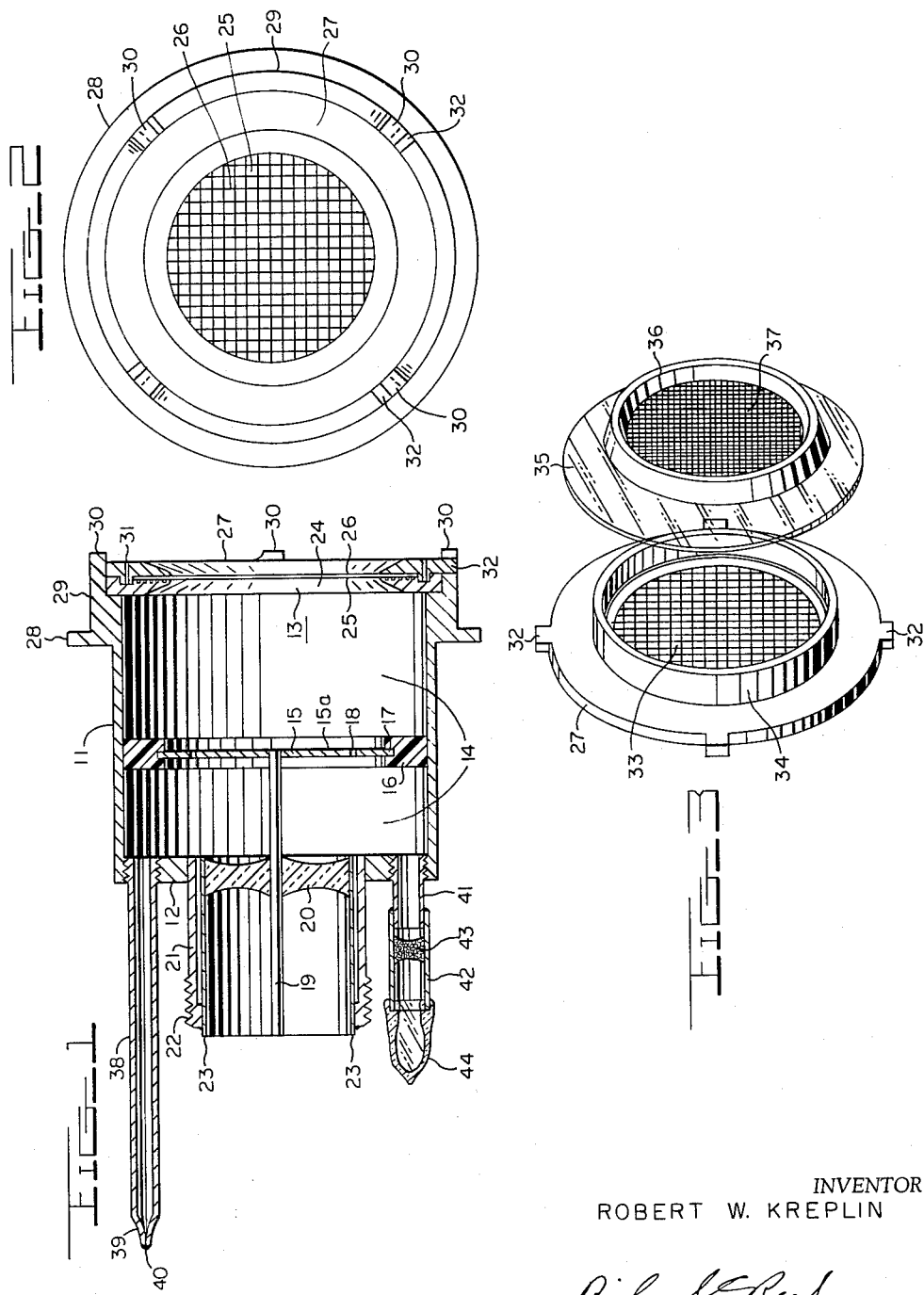
INVENTOR
ROBERT W. KREPLIN
BY *Richard G. Reed*
ATTORNEY

United States Patent Office 3,262,002
Patented July 19, 1966

3,262,002
CONVERTIBLE X-RAY DETECTOR
Robert W. Kreplin, Fort Washington Forest, Md., assignor to the United States of America as represented by the Secretary of the Navy
Filed July 17, 1961, Ser. No. 124,737
18 Claims. (Cl. 313—52)

The invention described herein may be manufactured and used by or for the Government of the United States of America for governmental purposes without the payment of any royalties thereon or therefor.

The present invention relates to a novel radiation detector for detecting soft X-rays. More particularly, the invention is concerned with an X-ray detector which operates initially as an ionization chamber and which is readily converted during space flight into a vacuum photocell.

Recent developments in radiation detection have demonstrated that thin film deposits of halide salts can be utilized as photoelectric cathode surfaces. For example, active metal halides, such as, lithium fluoride (LiF), sodium fluoride (NaF), sodium chloride (NaCl), and alkaline earth halides, for instance, calcium fluoride ($CaF_2$), and strontium fluoride ($SrF_2$) may be deposited on cathode surfaces to provide photocathodes which have relatively high photoelectric yields. However, it has been found that cathode surfaces, employing Group I and Group II metal halides, decrease in efficiency and deteriorate with time unless the salt deposits are protected from contaminants, and especially from water vapor.

It is therefore an object of the present invention to provide a novel X-ray detector with a relatively long shelf life and with an unlimited operable life for artificial satellites and other applications in the environment of outer space. Another object of the invention is to provide a radiation detector which can employ active metal halides more effectively as photoemissive surface layers than the prior art devices.

Gas photoionization chambers have been used in the environment of outer space to detect incident radiation and were fitted with radiation windows which, as a rule, were pervious to their gas fillings, consequently, the useful life of such detectors were found to be severely limited.

It is a further object of this invention to provide a novel detector tube which can operate effectively within the earth's atmosphere and which alters its mode of operation during space flight to overcome the disadvantages of previous radiation detectors in the environment of outer space.

A still further object of the invention resides in the use of a novel radiation detector of more rugged design which is especially suitable for space satellite experiments.

A detector tube is constructed in accordance with the present invention which utilizes a novel window structure capable of transmitting soft X-rays and which contains a gas filling that can be readily ionized by incident soft X-ray radiation. The electrode structure of the present detector is designed in such a fashion that one of the electrodes is made a photoelectric emitting surface. Initially, the detector requires a gas filling which acts as the medium in which photoionization occurs and which is also the medium that protects the photoelectric emitting surface from possible contamination. Once the vehicle in which the detector is mounted leaves the earth's atmosphere, the filling gas slowly leaks out through the window or through a special aperture. After the gas leakage is completed, the detector operates as a vacuum photocell, which will have an unlimited lifetime.

Other objects and advantages of the invention will hereinafter become more fully apparent from the following description taken in connection with the accompanying drawings, in which:

FIG. 1 is a longitudinal cross section view of the present radiation detector;

FIG. 2 is an end view of the radiation detector of FIG. 1 illustrating the structure of a metal foil window;

FIG. 3 is a partly exploded view of another embodiment showing the structure of a plastic film window.

Referring now to the drawings, wherein like reference characters designate like parts, there is shown in FIG. 1 the detailed structure of a detector tube which has a metallic, ceramic or vitreous envelope 11, cylindrical in shape and extending along one end thereof to form a flat annular side 12; the opposite end of said cylindrical envelope is adapted to receive a window 13 capable of transmitting radiation energy in the soft X-ray region of the spectrum. When the envelope is formed of a non-metallic material, a metallic inner surface is provided of any convenient metal to serve as the positive electrode or anode of the detector tube. A metal plate 15 is vertically disposed within tube space 14 and positioned directly opposite the radiation window 13 to serve as the negative electrode or cathode of the present detector tube. A photoelectric surface layer 15a, which is deposited by any convenient means on the metal plate, provides the necessary electron emissions from the cathode whenever soft X-rays in the spectral range of about 1–100 Angstroms impinges on said layer. It has been found desirable to employ a metal halide deposit, such as an alkali halide or an alkaline earth halide, which have relatively high photoelectric yield, although other substances, for example, suitable metallic or semiconductive layers which are known to be photoemissive under vacuum conditions may also be employed on the cathode without departing from the scope or spirit of the present invention.

The metal plate 15 is held in place and insulated from the metal cylinder by means of an insulating ring 16 composed of a high insulating material, such as, a sintered glass or a rubber composition; the insulating ring has an annular groove 17 into which said metal plate is snapped into position, or it may be inserted initially into the molded composition of the ring and subsequently sintered or cast into rigid form. The metal plate has a plurality of openings 18 that provide means for admitting the gas filling into tube space 14. A cathode lead wire 19 provides electrical connection to said metal plate by passing through a small opening in the center of the plate and being soldered thereto, care being exercised to avoid surface irregularities that might form conductive paths during the operation of the detector. The cathode lead wire is supported by means of a glass seal 20 which is formed on the surface of a metal alloy, as will be explained presently, having a heat coefficient similar to that of glass. A tubular sleeve 21 is attached to the annular side 12 of the tube, said sleeve having a threaded end 22 that provides a convenient means for mounting thereto an electrical connector or cable.

A relatively thin, inner metallic jacket 23, coextensive and spaced from said tubular connector 21 by a spacer flange on the inner edge of said connector, is made of any suitable alloy or metal, as previously mentioned, which has a coefficient of heat expansion comparable to that of the glass seal 20. An iron-nickel-cobalt alloy sold commercially under the name "Kovar" may be used to form said inner jacket. In assembling the present tube, the glass seal between the inner jacket and the cathode lead wire 19 is formed initially, and the joined parts are then inserted into the sleeve 21 and solder is applied around the edges of said sleeve and said inner jacket.

Solder is also applied to the metal plate to connect the cathode lead wire thereto, as previously mentioned. These soldering connections are performed with a minimum flow of heat, thus protecting the glass seal therein from excessive heat that might otherwise soften and deform it.

Turning now to the detailed structure of the radiation window 13, shown in FIGS. 1 and 2, a sash ring 24 having on the surface thereof a series of annular striations and a rectangular groove therein near its outer periphery, provides a support for metal foil 25. The metal foil which is sufficiently thin to be capable of transmitting radiation in the spectral range of about 1–100 Angstroms is a metal of low atomic number, preferably aluminum or beryllium, having a thickness in the neighborhood of about 0.001 to 0.00025 inch.

An electroformed metallic gauze 26 of square pattern is attached to the face surface of said metal foil by means of epoxy resin to provide sufficient reinforcement to the thin foil to be capable of withstanding the inner gas pressure exerted against the thin foil when the detector tube is in a region of highly rarefied atmosphere. More specifically, the metallic gauze may be made of nickel of about 20 mesh and may be attached to an aluminum foil of about 0.00025 inch in thickness; said foil and gauze being of a diameter size sufficient to cover the surface of striations on the sash ring but which does not extend as far as the rectangular groove therein.

In assembling the window, an epoxy cement is spread on the sash ring 24, the metallic gauze with the attached metallic foil is then centered over said sash ring, and a lock ring 27, having a raised rectangular rim on the lower surface thereof, is positioned over said sash ring. The raised rectangular rim of said lock ring fits into the rectangular groove in said sash ring to secure proper alignment of said rings, while the annular striations thereon provide means for gripping the metal foil uniformly. Excess cement between the rings is squeezed out through a series of small openings 31 that pass through the raised rectangular rim on said lock ring. The assembled window is attached to the detector tube by means of insert lugs 32 which project out from the outer edge of said lock ring. A marginal rim 29 arising from a radial flange 28 on the tube envelope extends forward and forms a ledge on the edge of said envelope. The assembled window rests on said ledge, and retainer lugs 30 that project from the edge of said marginal rim 29 engage the insert lugs 32 of the assembled window 13 by rotating said assembly until the respective lugs are brought into locking engagement. Epoxy cement seals the outer edge of the sash ring with said inner ledge of the cylindrical envelope, and the cement is also applied to the interlocking lugs to provide an air-tight detector tube.

The gas filling of the present detector device comprises inert type photoionizable media, such as, helium, nitrogen, neon, argon, etc., which are used singly or in combination to obtain different operating characteristics, said filling is also advantageously utilized in the present detector tube as an inert, anhydrous atmosphere over the photoelectric layer to shield the same from possible contamination or deterioration during storage or during the photoionization mode of operation.

The gas filling is introduced into the tube space through an inlet tube 38, preferably of soft copper, which is sealed into the annular back wall 12 of the tube. The gas introduced through said inlet tube passes through openings 18 in the cathode to occupy the space between the cathode and the radiation window. After the gas has been admitted, the end of the inlet tube is pinched tightly together, as shown at 39, to seal the end thereof, and solder is applied to the sharp metal edge to preserve it from possible breakage.

There is also provided in the present detector, in accordance with the invention, an outlet tube of any suitable metal, said tube connecting with the tube space and made externally accessible through a tubular adapter 42 which contains therein a porous plug or membrane 43, which is pervious to the enclosed gas. A glass seal 44 prevents the gas from escaping during storage or during operation of the device as a photoionizable detector. When the detector tube, however, is to be operated for a prolonged period at a substantially reduced atmospheric pressure, it has been found more desirable to alter the detector's mode of operation to obtain a more stable type detector device. The glass seal 44 may be manually broken to allow the gas medium to escape from the tube, and thus convert the detector into a vacuum photocell. The glass end of the tube may be broken by any well-known means such as squib-operated hammers which are well known in the art. Such means for breaking the glass are not considered a part of this invention.

Photoionization occurs more readily than photoemission, thus the detector containing a photoionizable gas will normally operate as an ionization chamber. A source of potential in series with the detector, maintains the atmosphere in the device at a potential which will cause rapid production of ion pairs upon introduction of soft X-ray radiation. Upon entry of ionization-producing radiation into the atmosphere of the device through the window thereof, ion pairs will form in proportion to the intensity of the transmitted radiation. The electrons so formed migrate to the anode, and the resulting electrical current passes out into an external circuit.

The X-ray window used in the present detector may also advantageously employ thin plastic films to transmit radiation in the soft X-ray spectral range. In the embodiment illustrated in FIG. 3, there is provided a thin plastic film 35 capable of transmitting radiation in the spectral range of about 1–100 Angstroms. In the present embodiment the lock ring 27 is provided with a border hoop 34 surrounding the central opening of the ring, and a wire gauze 33 similar to the wire mesh of the previous embodiment is attached to the lock ring. A retainer hoop 36 with tapering lateral sides is provided with a metallic wire gauze 37 of very fine mesh, cemented to the bottom thereof. The fine wire mesh employed for this purpose may be an electro-formed nickel, as fine as 500 mesh to provide frontal support for the thin plastic film. The fine mesh is prescribed to prevent formation of a pattern between the front and back wire gauzes. In mounting the plastic film window, the plastic sheet is placed over the border hoop 34 and retainer hoop 36 is then inserted into the border hoop to draw the plastic film taut, in the manner of embroidery hoops. The spacing between said hoops is then filled with epoxy cement to provide upon hardening a rigid air-tight sealer.

Plastic films which have been found effective for use as soft X-ray radiation windows include, for example, Mylar, Glyptal, polyethylene, Teflon, Lucite, polystyrene, epoxy resin, cellulose acetate and nitrocellulose. Mylar is a trade name of the Du Pont Company which film is prepared from a polyester resin which is produced by the condensation of ethylene glycol with terephthalic acid and is known by the chemical name polyethylene terephthalate. Glyptal is a trade name of The General Electric Company and is an alkyd film. Teflon and Lucite are trade names of the Du Pont Company; Teflon is a polytetrafluoroethylene, and Lucite is an acrylic (methyl methacrylate) resin. The X-ray transmittance of said films depends essentially upon their chemical composition and thickness in which they are employed. Plastic film sizes are more conveniently designated by means of their weight per unit area. Generally the plastic window varies in weight from about five to ten hundredths of a milligram per square centimeter, the lower weight or thinner material admitting softer radiation. Mylar, for example, is used as a film designated as 0.8 milligram per square centimeter, while Glyptal is used in a film of 0.01 milligram per square centimeter. These film sizes have been found effective in transmitting soft X-ray in the spectral range from about 1 to about 100 Angstroms. Plastic films of this size are, moreover sufficiently porous to allow the enclosed gas to permeate through the plastic substance. Normally at atmospheric pressure the enclosed gas does not escape through the plastic window, with the possible exception of helium, but in regions of highly rarefied atmosphere, the pressure within the tube tends to accelerate the leakage of gas through the plastic film.

There is produced by following the teachings of this invention, an X-ray detector containing an atmosphere of an ionizable gas which is also an effective medium for protecting a halide salt deposit on the cathode from contamination. The X-ray detector operates normally as an ionization chamber, but when it is employed in a highly rarefied atmosphere, the gas filling either (1) leaks out from a plastic window or (2) a special aperture is provided to allow the escape of the gas. After the gas filling has been removed, the photoelectric cathode surface of the tube will emit photoelectrons, and the detector tube operates essentially as a vacuum photocell. The novel window structures provide reinforced metallic foils and plastic sheets which can withstand the gas pressures exerted against them.

Since the invention described herein may be variously practised without departing from the spirit or scope thereof, it is to be understood that this invention is not limited to the specific embodiments thereof except as defined in the appended claims.

What is claimed is:

1. A detector tube comprising a metallic envelope which serves as the anode, said envelope containing nitrogen, a plastic film window at one end of said envelope capable of transmitting radiation in the spectral region of about 1–100 Angstroms, and a cathode plate opposite said window.

2. A detector tube in accordance with claim 1 having a window formed of a film of polyethylene terephthalate.

3. A detector tube in accordance with claim 1 having a polytetrafluoroethylene film window.

4. A detector tube in accordance with claim 1 having a window formed of a film of alkyd.

5. A detector tube in accordance with claim 1 having a nitrocellulose film window.

6. A detector tube comprising an envelope having a conducting inner surface which serves as the anode, said envelope containing a photoionizable gaseous medium, a cathode secured within said envelope, and a polyethylene terephthalate film window on said envelope capable of transmitting radiation in the spectral region of about 1–100 Angstroms, said window having a pair of interlocked hoops for retaining said film therebetween.

7. A detector tube comprising an envelope having a conducting inner surface which serves as the anode, said envelope containing nitrogen, a cathode secured within said envelope, a plastic film window on said envelope capable of transmitting radiation in the spectral region of about 1–100 Angstroms, said plastic film being retained on said envelope between interlocked hoops, said hoops having wire meshes attached thereto for supporting said film.

8. An X-ray detector capable of being converted from an ionization chamber operable within a surrounding at atmospheric pressure to a vacuum photocell during operation within a substantially reduced atmospheric pressure comprising an envelope, an anode and a cathode within said envelope, said cathode having a photoelectric surface which is sensitive in the spectral region of from about 1 to about 100 Angstroms, a filling of a photoionizable gaseous medium, a window opposite said cathode capable of transmitting radiation in the spectral region of from about 1 to about 100 Angstroms, and means for allowing said gaseous medium to escape from said envelope when said detector is within a surrounding of reduced atmospheric pressure to change the mode of operation of said detector to that of a vacuum photocell.

9. An X-ray detector capable of being converted from an ionization chamber operable within a surrounding at atmospheric pressure to a vacuum photocell during operation within a substantially reduced atmospheric pressure comprising an envelope, an anode and a cathode within said envelope, said cathode having a thin film deposit of a halide salt which is sensitive in the spectral region of from about 1 to about 100 Angstroms, a filling of a photoionizable gaseous medium, a window opposite said cathode capable of transmitting radiation in the spectral region of from about 1 to about 100 Angstroms and means for allowing said gaseous medium to escape from said envelope when said detector is within a surrounding of reduced atmospheric pressure to change the mode of operation of said detector to that of a vacuum photocell.

10. An X-ray detector capable of being converted from an ionization chamber operable within a surrounding at atmospheric pressure to a vacuum photocell during operation within a substantially reduced atmospheric pressure comprising an envelope, an anode and a cathode within said envelope, said cathode having a thin film of an alkali metal halide, a filling of inert gas which is photoionizable, a window opposite said cathode capable of transmitting radiation in the spectral region of from about 1 to about 100 Angstroms and an aperture in said envelope associated with gas-pervious means for allowing said inert gas to escape from said envelope when said detector is within a surrounding of reduced atmospheric pressure to change the mode of operation of said detector to that of a vacuum photocell.

11. An X-ray detector capable of being converted from an ionizable chamber operable within a surrounding at atmospheric pressure to a vacuum photocell during operation within a substantially reduced atmospheric pressure comprising an envelope having a conducting inner surface which serves as the anode, a cathode within said envelope, said cathode having a thin film of an alkali metal halide, a filling of a photoionizable gaseous medium, a window opposite said cathode capable of transmitting radiation in the spectral region of from about 1 to about 100 Angstroms and an aperture in said envelope associated with a porous plug for allowing said gaseous medium to escape from said envelope when said detector is within a surrounding of reduced atmospheric pressure to change the mode of operation of said detector to that of a vacuum photocell.

12. An X-ray detector capable of being converted from an ionizable chamber operable within a surrounding at atmospheric pressure to a vacuum photocell during operation within a substantially reduced atmospheric pressure comprising a metallic envelope which serves as the anode, a cathode plate within said envelope, said cathode having a thin film of an alkali metal halide, a filling of nitrogen gas, a window opposite said cathode plate capable of transmitting radiation in the spectral region of from about 1 to about 100 Angstroms and an aperture in said envelope associated with a porous plug for allowing said nitrogen gas to escape from said envelope when said detector is within a surrounding of reduced atmospheric pressure to change the mode of operation to said detector to that of a vacuum photocell.

13. An X-ray detector capable of being converted from an ionizable chamber operable within a surrounding at atmospheric pressure to a vacuum photocell during operation within a susbtantially reduced atmospheric pressure comprising an envelope having a conducting inner surface which serves as the anode, a cathode plate within said envelope, said cathode having a thin film of an alkaline earth halide, a filling of nitrogen gas, a window opposite said cathode plate capable of transmitting radiation in the spectral region of from about 1 to about 100 Angstroms, an aperture in said envelope having a porous plug closure and breakable sealing means for said closure for allowing said nitrogen gas to escape from said envelope when said detector is within a surrounding of reduced atmospheric pressure to change the mode of operation of said detector to that of a vacuum photocell.

14. An X-ray detector capable of being converted from an ionization chamber operable within a surrounding at atmospheric pressure to a vacuum photocell during operation within a substantially reduced atmospheric pressure comprising a metallic envelope which serves as anode, a cathode plate within said envelope having a thin film of an alkaline earth halide, a filling of helium, a window opposite said cathode plate capable of transmitting radiation in the spectral region of from about 1 to about 100 Angstroms, an aperture in said envelope having a membrane closure and breakable sealing means for said closure for allowing said helium gas to escape from said envelope when said detector is within a surrounding of reduced atmospheric pressure to change the mode of operation of said detector to that of a vacuum photocell.

15. A detector tube in accordance with claim 9 in which the window is an aluminum foil.

16. A detector tube in accordance with claim 10 in which the window is a metal foil.

17. A detector tube in accordance with claim 16 in which said metal foil has a wire gauze attached thereto for support.

18. A detector tube in accordance with claim 11 in which the window is a beryllium foil.

References Cited by the Examiner
UNITED STATES PATENTS

| | | | |
|---|---|---|---|
| 2,306,376 | 12/1942 | Beuchon | 313—94 |
| 2,449,697 | 9/1948 | Graves | 313—93 |
| 2,465,821 | 3/1949 | Smoluchowski | 313—93 |
| 2,552,440 | 2/1951 | Victoreen | 313—93 |
| 2,631,246 | 3/1953 | Christian | 313—93 X |
| 2,898,498 | 8/1959 | Philipp | 313—94 X |
| 2,925,509 | 2/1960 | Hayes | 313—93 |
| 2,953,702 | 9/1960 | Zieler | 313—93 |

DAVID J. GALVIN, *Primary Examiner.*

RALPH G. NILSON, GEORGE N. WESTBY, *Examiners.*

J. W. LAWRENCE, P. C. DEMEO, *Assistant Examiners.*